United States Patent [19]

Takahashi et al.

[11] 4,259,587
[45] Mar. 31, 1981

[54] X-RAY LUMINESCENT GLASSES

[75] Inventors: Tatsuo Takahashi, Kanagawa; Osamu Yamada, Tokyo, both of Japan

[73] Assignee: RCA Corporation, New York, N.Y.

[21] Appl. No.: 82,532

[22] Filed: Oct. 9, 1979

[51] Int. Cl.³ .......................... G01J 1/58; G01N 21/64
[52] U.S. Cl. .................................... 250/486; 250/483; 252/301.4 P; 252/301.6 P
[58] Field of Search .................... 250/483, 486, 368; 252/301.4 P, 301.6 P

[56] References Cited

U.S. PATENT DOCUMENTS

| | | | |
|---|---|---|---|
| 3,642,651 | 2/1972 | Marboe et al. | 252/301.4 R |
| 3,855,144 | 12/1974 | Barber et al. | 252/301.4 F |
| 4,022,707 | 5/1977 | Deutschbein | 252/301.6 P |
| 4,038,203 | 7/1977 | Takahashi | 252/301.4 P |
| 4,153,838 | 5/1979 | Mayeux | 250/368 |

OTHER PUBLICATIONS

"Sensitization of Tb³⁺ Lum. by Ce³⁺ and Cu⁺ in Glasses", Shionoya et al., *App. Phy. Letters*, vol. 6, No. 6, Mar. 1965.
"Crystal Structure of Potassium Neodymium Metaphosphate, KNd P$_4$O$_{12}$, A New Acentric Laser Material", Hong, *Mat. Res. Bull.*, vol. 10, 1975, pp. 1105-1110.
"Fluorescence in Lithium Neodymium Ultraphosphate Single Cry.", Yamada et al., *J. of App. Phys.*, vol. 45, No. 11, Nov. 1974.
"Preparation and Fluorescent Properties of Li Pure Earth Phosphate Phosphors", Tsujimoto et al., *Solid State Sci. & Tech.*, Apr. 1977.
"The Crystal Structure of Y Metaphosphate, YbP$_3$O$_9$", Hong, *Acta Cryst.* (1974), B30, 1857-1861.
"Luminescence of Terbium-Activated Alkali Rare Earth Metaphosphate Glasses", Takahashi et al., *Extended Abs.*, vol. 79-1, No. 223, pp. 574-575, May 1979.
"Absolute X-Ray Efficiencies of Some Phosphors", Poorter et al., *J. of Electrochemical Soc.*, Aug. 1975, pp. 1086-1088.
"Theo. and Exp. Efficiencies of X-Ray Screens", Stevels et al. *Solid-State Sci. and Tech.*, Jun. 1976, pp. 886-888.

*Primary Examiner*—Bruce C. Anderson
*Attorney, Agent, or Firm*—Birgit E. Morris

[57] ABSTRACT

X-ray luminescent glasses comprising a divalent cation such as an alkaline earth metal or other divalent cations such as Pb, Cd, or Zn, and certain rare earth metaphosphates are suitable as vitreous, X-ray phosphors or X-ray luminescent glass fibers in an X-ray intensifying screen. The glasses have the composition $$n(MO \cdot P_2O_5)[(1-y)Tb_2O_3 \cdot yCe_2O_3 \cdot 3P_2O_5]$$

wherein n is greater than zero but less than or equal to 16, M is an alkaline earth metal or other divalent cation such as Pb, Cd, or Zn, and y is greater than or equal to zero but less than one.

23 Claims, 5 Drawing Figures

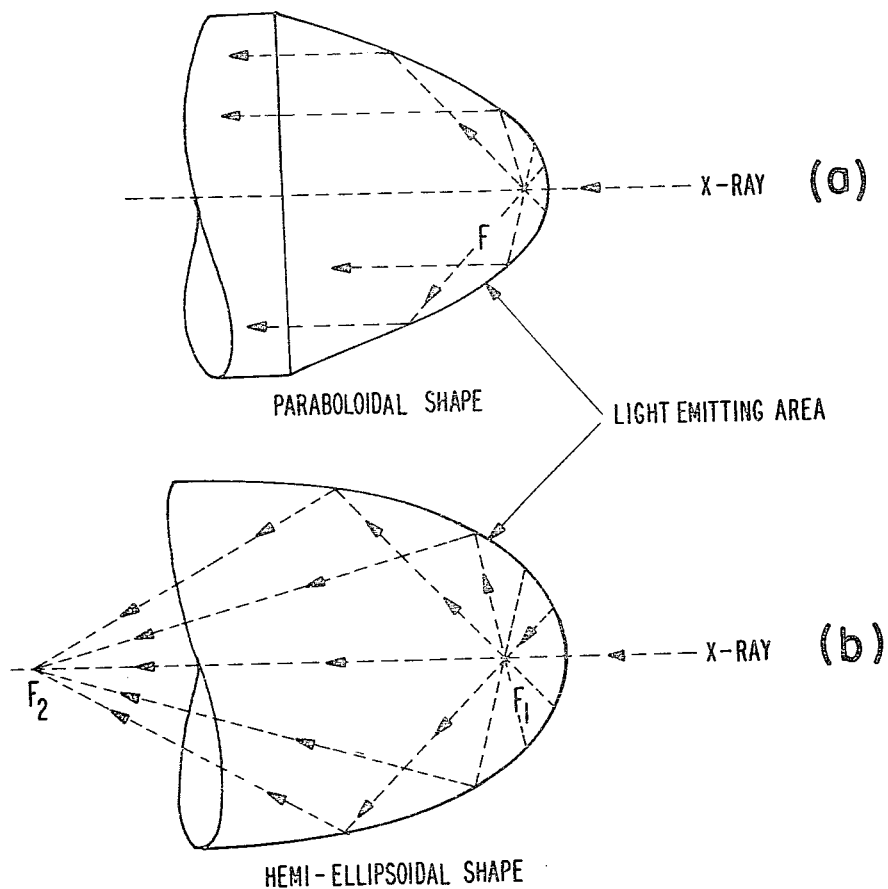
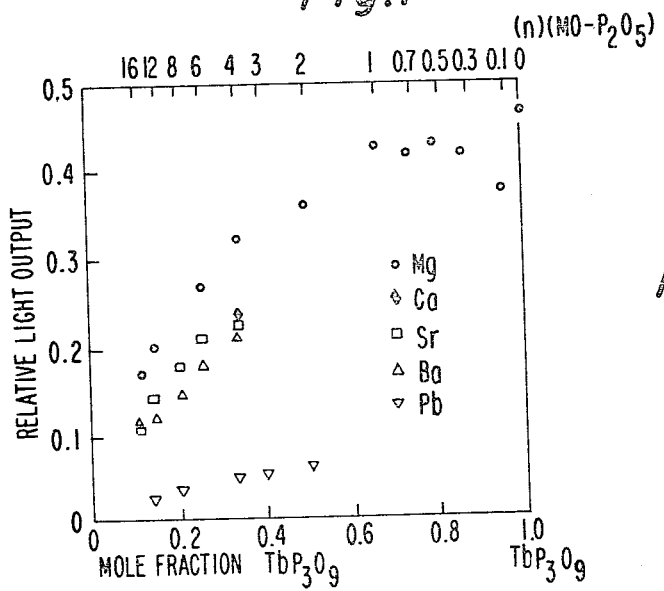

X-RAY LUMINESCENT GLASSES

BACKGROUND OF THE INVENTION

Powder X-ray phosphors, such as $CaWO_4$, $Gd_2O_2S:Tb$, $LaOBr:Tb$, and $BaFCl:Eu$ are known and used as X-ray intensifying screens in X-ray radiology, X-ray spectrometry, and X-ray radiography. Powder phosphors are not readily formable into complex shapes. Crystalline $NaI:Tl$ and $Bi_4Ge_3O_{12}$ (BGO) are used as the X-ray scintillator for scintillation counters. Crystalline and powdered crystalline phosphors are also difficult to form into complex shapes.

Vitreous or glassy phosphors, either in powder or glass form, would be desirable where X-ray phosphors are used. However, vitreous phosphors or glassy phosphors tend to have low X-ray to light conversion efficiencies when compared to the previously mentioned crystalline phosphors. The development of a vitreous or glassy phosphor with a higher light output would enable the formation of a transparent glass which is easily formable into any desired shape. The activator can be more evenly distributed in the glassy phosphor than in a crystalliine phosphor. Lower cost scintillators could be produced with a cast glass phosphor than with crystalline phosphors.

U.S. Pat. No. 4,038,203 discloses certain alkali metal-rare earth temperature ultra-violet photoluminescent glasses. The alkali photoluminescent glasses described in the patent are hydroscopic and have a tendency to crack during preparation. In addition, for the terbium-activated alkali metal-rare earth metaphosphate glasses of the patent, increasing the atomic weight of the alkali metal with a fixed n or increasing the n for a fixed alkali metal increases the intensity of the light emitted from the glass as reported at the May 1979 Electrochemical Society Meeting and in the Extended Abstracts, Vol. 79-1, Abstract No. 223, pp. 574–575.

Thus, it would be highly desirable to have a transparent glass which exhibits X-ray luminescence, does not crack or absorb water during preparation, can be cast or formed into shapes, and permits a more homogeneous incorporation of the activator into the composition than with a crystalline phosphor.

SUMMARY OF THE INVENTION

An X-ray photoluminescent glass having the composition:

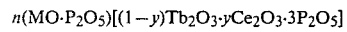

wherein y is greater than or equal to zero but less than 1, n is greater than zero but less than or equal to 16, and M is an alkaline earth metal or other divalent cation such as Cd, Zn, or Pb. The glasses of the present invention emit a greenish light when irradiated with an X-ray source. In addition, the glasses of the present invention do not discolor upon repeated irradiations with X-rays generated at a tube voltage of about 60 KV.

BRIEF DESCRIPTION OF THE DRAWINGS

FIGS. 1a and 1b illustrate the effect of the glass shape on the emitted light.

FIG. 2 illustrates the relative light output for certain metaphosphate glasses of the invention.

DETAILED DESCRIPTION OF THE INVENTION

Figure 3:
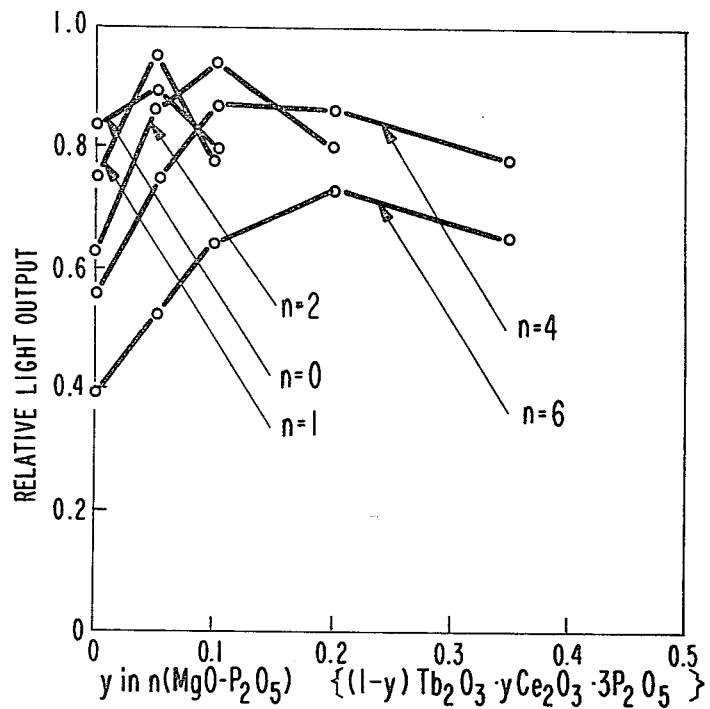
FIG. 3 illustrates the relative light output of another metaphosphate glass of the invention.

Metaphosphate glasses of the present invention having the formula:

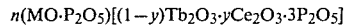

wherein M is an alkaline earth metal or other divalent cation such as Cd, Zn, or Pb, n is greater than zero but less than or equal to 16, and y is greater than or equal to zero but less than 1, i.e., $0 < n \leq 16$ and $0 \leq y < 1$, respectively. The glasses of the present invention are fabricated by forming a mixture of the appropriate stoichiometric amounts of an oxide of the alkaline earth metal or divalent cation, an oxide of terbium, and $(NH_4)_2HPO_4$ or other appropriate phosphate. The mixture is ground in a ball mill for a time sufficient to uniformly distribute all the components throughout the total composition. Optionally, the mixture can include an oxide of cerium as a coactivator.

After mixing, the composition is placed in an alumina or platinum crucible or like receptacle with a lid and slowly heated at a rate of from about 15° C. to about 50° C. per hour until a temperature of about 600° C. is achieved. A constant temperature is maintained for a time sufficient to evolve all the gases produced during the initial melting and heating. Thereafter, the mixture is heated quickly at a rate of from about 200° C. to about 500° C. per hour to a temperature of from about 1150° C. to about 1400° C. The melt is maintained at this temperature for a period of from about 2 to about 3 hours.

The melt is then poured into a graphite die or other die of suitable material for shaping the glass into any desired configuration such as a plate glass structure, hemi-ellipsoidal, or paraboloidal or like shape. The die, containing the melt, is annealed at a temperature of from about 500° C. to about 550° C. for from about 1 to about 2 hours in an electric furnace or other suitable furnace. After annealing, the glass is gradually cooled from the annealing temperature to room temperature over a period of about 24 hours or longer.

As illustrated in FIG. 1a, if the glass is shaped in a paraboloidal shape, then light passing through the focal point of the paraboloid will be reflected to become parallel to the axis of the glass. In a bundle of terbium metaphosphate glass fibers with paraboloidal ends, the light will be reflected through the glass fiber. If the cast glass is sufficiently large so that it could be mounted directly onto a photomultiplier tube (PMT), then the glass should be cast in a hemi-ellipsoidal shape so that light passing through the focal point of the ellipsoid will be collimated at a second focal point where the glass is mounted to the photomultiplier tube as illustrated in FIG. 1b.

U.S. Pat. No. 4,153,838, incorporated herein by reference, illustrates light collector shapes which collimate the light emitted by a scintillator crystal of BGO onto a photomultiplier tube. Unlike the patent, which requires a special crystal, terbium metaphosphate glasses can be shaped into the light collector shape. Direct shaping of the glass enables the production of collimating shapes without a flat incident surface into which a crystal must be fitted.

Glasses of the present invention were irradiated with a Siemens Crystalloflex II copper, Cu, target tube X-ray source. The X-ray source was operated at a voltage of between about 20 to about 60 KV at a tube current of about 15 milliamps. The X-ray radiation from the tube was collimated into a beam about 4 mm in diameter. An aluminum block about 10 mm thick was placed in front of the collimator tube to cut the low energy portion of the X-ray radiation including the characteristic copper radiation, i.e., Cu Kα, at about 8 KeV. Light emitted from the metaphosphate sample was detected with an RCA C83001E photomultiplier fitted with a Teledyne 1090 preamplifier. A barium-lanthanum (Ba-La) glass window transparent down to 300 nm was attached in front of the photomultiplier for protection. The metaphosphate glass was pasted onto the Ba-La glass window using Dow-Corning Q2-3067 coupling grease to minimize the loss of the emitted light. The intensity of the transmitted X-rays was measured using a PIN silicon photodiode as a light detector. A BGO crystal of the same size as the terbium metaphosphate glass was used as a standard. (BGO=1).

Referring to FIG. 2, the FIGURE illustrates that the relative light output (RLO) of divalent metal ion terbium metaphosphate glasses decreases with increasing atomic number of the alkaline earth metal or divalent metal ion such as Pb and an increase of the n value of the $n(MO \cdot P_2O_5)$ component of the glass composition. When n is equal to 0, the glass formed is $TbP_3O_9$ which is derived from the following: the mole fraction of $TbP_3O_9$ is equal to two times the mole fraction of $Tb_2O_3 \cdot 3P_2O_5$ times $TbP_3O_9$, i.e., $0.5(Tb_2O_3 \cdot 3P_2O_5) = TbP_3O_9$. When n is greater than 0, the metaphosphate mole fraction of $TbP_3O_9$ equals $2/(n+2)$.

The glasses of FIG. 2 were about $2.7 \pm 0.1$ mm thick with a width of about $8 \pm 0.1$ mm and a length of about $8 \pm 0.1$ mm. The increase in the RLO is in contrast to the increase in the RLO of the alkali metal terbium metaphosphate glass of U.S. Pat. No. 4,038,203, wherein the RLO of the UV luminescent alkaline metal terbium metaphosphates increased with increasing atomic number or n value for a given alkali metal. As is evident from the data, magnesium is the preferred divalent metal ion in the metaphosphate glass composition.

The addition of Ce to the metaphosphate system enhances the X-ray luminescent properties of the metaphosphate glass. Cerium is a coactivator for the terbium metaphosphate glass. FIG. 3 illustrates the increase in the RLO for a magnesium-terbium-cerium metaphosphate glass with increasing concentrations of cerium for a given n value of the magnesium metaphosphate moiety of the metaphosphate glass.

Figure 4:
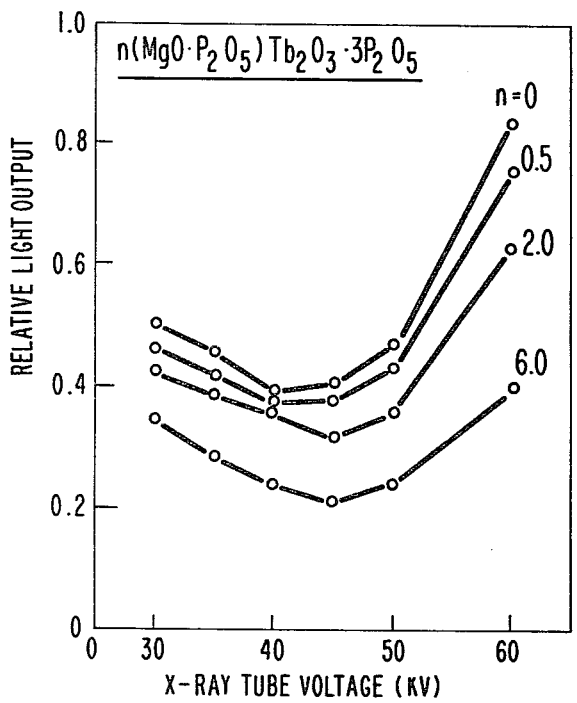
FIG. 4 illustrates the relative light output for a metaphosphate glass of the invention.

The luminescence of the metaphosphate glasses of the present invention are dependent upon the energy of the X-ray radiation. Below photon energies of about 25 KeV the glasses do not luminesce. The RLO of the metaphosphate glasses, for example a magensium-terbium metaphosphate glass, decrease with increasing X-ray tube voltage from about 30 KV to about 45 KV, and abruptly increase at 60 KV as illustrated in FIG. 4. The average X-ray photon energy is about two-thirds of the X-ray tube voltage or about 40 KeV at a tube voltage of about 60 KV. The maximum X-ray photon energy would be about 60 KeV at a tube voltage of about 60 KV.

The X-ray absorption in these glasses is predominately due to the Tb, since the X-ray absorption coefficient of an element is proportionate to the cube of its atomic number. The X-ray absorption coefficient of Tb decreases with increasing photon energy below about 50 KeV, but increases abruptly at its K-absorption edge of about 52 KeV. Since most X-ray tubes used for medical diagnosis are operated at voltages of between about 80 and 120 KV, the use of a terbium or a magnesium-terbium or a magnesium-terbium-cerium metaphosphate glass as an X-ray scintillator would provide results which surpass the light emission of standard BGO crystals normally used in medical diagnostic equipment.

Several flat plate samples of the metaphosphate glass $6(MgO \cdot P_2O_5)Tb_2O_3 \cdot 3P_2O_5$ having thicknesses of from about 1 mm to about 3.45 mm were irradiated with X-ray radiation generated at an X-ray tube voltage of 60 KV. The ratio of the intensity of the transmitted X-rays (I) to the intensity of the incident X-rays ($I_o$) decreased with increasing sample thickness. The light output, measured in arbitrary units, remained constant indicating that the emitted light was dissipated in the thicker samples. Light output in arbitrary units means that the photocurrent of PMT is measured under the fixed PMT voltage of 600 V and a resistance, $R_L$, of 100 KΩ, throughout. The light emitting area of the plate glass sample was confined to a very thin layer under the radiated surface. This implies the need to fabricate the glass in very thin sheets for X-ray intensifying screens to minimize the losses due to scatterning and to lower the cost of the screen.

Various compositions of magnesium-terbium-cerium metaphosphates in a plate or hemi-ellipsoidal shape are illustrated in Table I below.

TABLE I

| Composition | Plate $I/I_o$ | Plate $(RLO)_P$ | Hemi-ellipsoid $I/I_o$ | Hemi-ellipsoid $(RLO)_E$ | $(RLO)_E/(RLO)_P$ |
|---|---|---|---|---|---|
| BGO | $10^{-8}$ | 1.000 | — | — | — |
| $0.95Tb_2O_3 \cdot 0.05Ce_2O_3 \cdot 3P_2O_5$ | $3.8 \times 10^{-2}$ | 0.897 | $10^{-5}$ | 1.348 | 1.503 |
| $0.9Tb_2O_3 \cdot 0.1Ce_2O_3 \cdot 3P_2O_5$ | $7.4 \times 10^{-2}$ | 0.798 | $10^{-4}$ | 1.118 | 1.399 |
| $(MgO \cdot P_2O_5)[0.95Tb_2O_3 \cdot 0.05Ce_2O_3 \cdot 3P_2O_5]$ | $7.6 \times 10^{-2}$ | 0.952 | $10^{-4}$ | 1.281 | 1.345 |
| $(MgO \cdot P_2O_5)[0.9Tb_2O_3 \cdot 0.1Ce_2O_3 \cdot 3P_2O_5]$ | $3.8 \times 10^{-2}$ | 0.789 | $10^{-4}$ | 1.185 | 1.502 |
| $2(MgO \cdot P_2O_5)[0.9Tb_2O_3 \cdot 0.1Ce_2O_3 \cdot 3P_2O_5]$ | $1.2 \times 10^{-1}$ | 0.942 | $10^{-3}$ | 1.379 | 1.463 |
| $2(MgO \cdot P_2O_5)[0.8Tb_2O_3 \cdot 0.2Ce_2O_3 \cdot 3P_2O_5]$ | $9.4 \times 10^{-2}$ | 0.801 | $10^{-3}$ | 1.264 | 1.578 |
| $4(MgO \cdot P_2O_5)[0.9Tb_2O_3 \cdot 0.1Ce_2O_3 \cdot 3P_2O_5]$ | $1.7 \times 10^{-1}$ | 0.873 | $10^{-3}$ | 1.288 | 1.475 |
| $4(MgO \cdot P_2O_5)[0.8Tb_2O_3 \cdot 0.2Ce_2O_3 \cdot 3P_2O_5]$ | $1.3 \times 10^{-1}$ | 0.863 | $10^{-3}$ | 1.259 | 1.458 |
| $4(MgO \cdot P_2O_5)[0.65Tb_2O_3 \cdot 0.35Ce_2O_3 \cdot 3P_2O_5]$ | $1.4 \times 10^{-1}$ | 0.784 | $10^{-3}$ | 1.077 | 1.373 |
| $6(MgO \cdot P_2O_5)[0.9Tb_2O_3 \cdot 0.1Ce_2O_3 \cdot 3P_2O_5]$ | $2.4 \times 10^{-1}$ | 0.645 | $10^{-2}$ | 1.173 | 1.818 |
| $6(MgO \cdot P_2O_5)[0.8Tb_2O_3 \cdot 0.2Ce_2O_3 \cdot 3P_2O_5]$ | $1.9 \times 10^{-1}$ | 0.736 | $10^{-2}$ | 1.264 | 1.717 |
| $6(MgO \cdot P_2O_5)[0.65Tb_2O_3 \cdot 0.35Ce_2O_3 \cdot 3P_2O_5]$ | $1.7 \times 10^{-1}$ | 0.652 | $10^{-2}$ | 1.206 | 1.849 |

The hemi-ellipsoidal shape which collimates the light on a second focal point shows marked improvement in light output. The hemi-ellipsoidal shape, formed by casting, had an a/b of about 3.7 mm and a of about 8 mm. The plate sample was about 2.7 mm in thickness. The light output of the hemi-ellipsoidal shape was about 50 percent better than that of the plate sample in glasses with integer values of n of zero and 1.

For glasses with n equals 4 to 6, as much as an 80 percent increase in light output was observed for the hemi-ellipsoidal shape. The light output of all hemi-ellipsoidal shaped compositions surpassed that of a standard crystalline BGO plate. The percentage difference in light output of the magnesium-terbium and magnesium-terbium-cerium metaphosphate glasses and the BGO plate will be larger as the X-ray tube voltage increases above 60 KV.

The glass compositions of the present invention can be fabricated into a flat plate glass like structure to form an X-ray scintillator screen or intensifier screen. Screens fabricated from the terbium-cerium metaphosphate glasses having a thickness of about 4.5 mm and specifically $2(MgO \cdot P_2O_5) \cdot 0.9Tb_2O_3 \cdot 0.1Ce_2O_3 \cdot 3P_2O_5$ compare favorably with powder phosphor screens such as ZnCdS (PFG-4125) and $Gd_2O_2S$:Tb (RE-4254-19) having a screen thickness of 445 microns and 216 microns respectively. The packing densities of the powder phosphor screens were 103 mg/cm$^2$ and 62 mg/cm$^2$ respectively. The PFG-4125 and RE-4254-19 screens were products of the U.S. Radium Corp., Medical Products Division. The light output of the metaphosphate glass screen is enhanced by about 30 to 40 percent with the application of a reflective coating such as $Al_2O_3$ on the radiated surface of the glass.

Terbium or terbium-cerium metaphosphate glasses can be fabricated in fiber form to enhance efficiency, i.e., light output, of the glass. A bundle of fine glass fibers can be arranged in a sheet form and used as a scintillator. A sheet comprised of parallel contiguous glass fibers with the axis of the fibers aligned parallel to an X-ray beam is effective or better than existing phosphor screens. The glass fiber sheet could absorb substantially all of the incident X-rays.

Table II below illustrates a comparison of a 4 mm thick glass fiber pile screen with known 100 mm thick powder phosphor screens listed therein.

TABLE II

| Phosphor | X-ray Absorption $1 - I/I_o$ (%) | X-ray to Light Loss Conversion Efficiency $\eta_x$ (%) | Screen Energy Light Correction Factor $C_s$ | Output $(1-I/I_o) \cdot \eta_x \cdot C_s$ |
|---|---|---|---|---|
| CaWO$_4$ | 10.0 | 6.5 | 0.5 | 33 |
| Zn$_2$SiO$_4$:Mn | 2.5 | 11.5 | 0.5 | 14 |
| ZnS:Ag | 3.5 | 17.0 | 0.5 | 30 |
| CsI:Tl | 7.0 | 10.0 | 0.7 | 49 |
| La$_2$O$_2$S:Tb | 20.0 | 12.5 | 0.5 | 125 |
| Gd$_2$O$_2$S:Tb | 22.0 | 13.0 | 0.5 | 143 |
| (MgO . P$_2$O$_5$) Tb$_2$O$_3$ . 3P$_2$O$_5$ Glass Fiber | 90.0 | 1.5 | 1.0 | 135 |

The light output was calculated at X-ray photon energies of E=55 KeV without taking into consideration the detection efficiency. The X-ray absorption data was calculated for 100 μm thick screens, except for the glass fiber screen which had a thickness of about 4 mm. The packing density was assumed to be 50 percent for the powder screens and 90 percent for the evaporated CsI:Tl and glass fiber screens. The $\eta_x$ was obtained from J. A. dePorter et al, "Absolute X-ray Efficiencies of Some Phosphors", J. Electrochem. Soc. 122, No. 8 pp. 1086–1088 (1975). The $\eta_x$ of the magnesium-terbium-metaphosphate was estimated by assuming the $\eta_x = 0.8$ percent for BGO at an X-ray tube voltage of 60 KV. The estimation included a correction factor for the wavelength sensitivity of the photomultiplier.

The data in Table II illustrates that the glass fiber screen is as good as or better than existing powder phosphor screens. In addition, glass fiber diameters can be selected to optimize image resolution with negligible effects on efficiency performance.

The invention will be further illustrated by the following Examples which are not meant to limit the invention. In the Examples, parts are by percent unless otherwise indicated.

EXAMPLE I

A magnesium-terbium metaphosphate glass having the composition $6(MgO \cdot P_2O_5)Tb_2O_3 \cdot 3P_2O_5$ was fabricated according to the following procedure. 1.5 grams of MgO, 2.319 grams of Tb$_4$O$_7$, and 14.741 grams of (NH$_4$)$_2$HPO$_4$ having a purity of 99.9 percent were placed in a 50 ml plastic jar together with alumina balls of about 10 mm in diameter for mixing. The composition was mixed for approximately 8 hours. Thereafter, the mixture was placed in an alumina crucible with a lid and heated in air at a rate of from about 15° C. to about 30° C. per hour until a temperature of about 600° C. was achieved. After gas evolution from the composition, the mixture was quickly heated at a rate of about 200° C. to about 500° C. per hour to a temperature of about 1300° C. The melt was kept at this temperature for a period of about 2 hours, and thereafter cast into a graphite die and annealed at a temperature of about 540° C. for 2 hours in an electric furnace. The glass was gradually cooled from the annealing temperature to room temperature at a rate of about 20°–30° C. per hour over a 24 hour period. The glass was a metaphosphate circular glass plate having the dimensions of about 20 millimeters (mm) in diameter and a thickness of about 10 mm with a weight of about 8 grams. A Siemens Crystalloflex II Cu target tube radiated the sample with X-rays at a tube voltage of about 60 KV. The glass composition with a sample of a thickness of 2.7 mm had a relative light output (RLO) of about 0.4, as indicated in FIG. 3.

EXAMPLE II

A magnesium terbium cerium metaphosphate glass having the composition $(MgO \cdot P_2O_5)0.9Tb_2O_3 \cdot 0.1Ce_2O_3 \cdot 3P_2O_5$ was fabricated according to the following procedure. 0.600 gram of MgO, 5.008 grams of Tb$_4$O$_7$, 0.512 gram of CeO$_2$, and 15.724 grams of (NH$_4$)$_2$HPO$_4$ having a purity of 99.9 percent were placed in a 50 ml plastic jar together with alumina balls of about 10 mm in diameter for mixing. The composition was mixed for approximately 16 hours. Thereafter, the mixture was placed in an alumina crucible with a lid and heated in air at a rate of from about 15° C. to about 30° C. per hour until a temperature of about 1000° C. was achieved. After gas evolution from the composition, the mixture was quickly heated at a rate of about 200° C. to about 500° C. per hour to a temperature of about 1400° C. The melt was kept at this temperature for a period of about 2 hours, and thereafter cast into a graphite die and annealed at a temperature of about 540° C. for 2 hours in an electric furnace. The glass was gradually cooled from the annealing temperature to room temperature at a rate of 20° C. to 30° C. per hour over a 24 hour period. The glass was a metaphosphate glass plate having the dimension of about 20 mm in diameter and a thickness of about 10 mm with a weight of about 10 grams. A Siemens Crystalloflex II Cu target tube radiated the sample with X-rays at a tube voltage of about 60 KV. The glass composition with a sample of a thickness of 2.7±0.1 mm gave an $I/I_o$ of about 0.038 and a relative light output of about 0.789 as previously indicated in Table I.

What is claimed is:

1. An X-ray photoluminescent glass having the composition:

$$n(MO \cdot P_2O_5)[(1-y)Tb_2O_3 \cdot yCe_2O_3 \cdot 3P_2O_5]$$

wherein y is less than one but equal to or greater than zero, n is less than or equal to 16 but greater than zero, and M is a divalent cation.

2. The glass according to claim 1 wherein M is selected from the group consisting of Mg, Ca, Sr, Ba, Cd, Zn, and Pb.

3. The glass according to claim 2 wherein M is Mg.

4. The glass according to claim 1 wherein y is equal to zero.

5. The glass according to claim 4 having the composition $6(MgO \cdot P_2O_5)Tb_2O_3 \cdot 3P_2O_5$.

6. The glass according to claim 1 having the composition $(MgO \cdot P_2O_5)0.9Tb_2O_3 \cdot 0.1Ce_2O_3 \cdot 3P_2O_5$.

7. The glass according to claim 1 wherein said glass is shaped such that the light emitted is perpendicular to the base of said shape.

8. The glass according to claim 7 wherein said glass has paraboloidal shape with a flat base abutting an X-ray photomultiplier tube.

9. The glass according to claim 1 wherein said glass is shaped to converge emitted light at a focal point outside said glass shape.

10. The glass according to claim 9 wherein said glass has a hemi-ellipsoidal shape with a flat base abutting an X-ray photomultiplier tube such that said photomultiplier tube is a second focal point of the ellipsoid which forms said hemi-ellipsoid.

11. The glass according to claim 1 wherein said glass is a flat plate.

12. An X-ray radiation detector comprising:
a photomultiplier tube, and a glass abutting said photomultiplier tube having the composition $$n(MO \cdot P_2O_5)[(1-y)Tb_2O_3 \cdot yCe_2O_3 \cdot 3P_2O_5]$$

wherein n is greater than zero but less than or equal to 16 and y is less than one but greater than or equal to zero, and M is a divalent cation, said glass disposed on said photomultiplier tube so as to permit said photomultiplier to collect the light emitted by said glass upon the illumination of said glass with X-rays.

13. The device according to claim 12 wherein the X-rays are generated at a tube voltage in excess of 60 KV.

14. The device according to claim 13 wherein the X-ray tube voltages are from about 80 to about 120 KV.

15. The device according to claim 12 wherein the divalent cation is selected from the group consisting of Mg, Ca, Sr, Ba, Cd, Zn, and Pb.

16. The device according to claim 15 wherein the divalent cation is Mg.

17. The device according to claim 12 wherein said glass is shaped such that light is emitted perpendicular to the base of said glass abutting said photomultiplier tube.

18. The device according to claim 17 wherein said glass abutting said photomultiplier tube has a flat base afixed to said photomultiplier tube and a glass shape which is paraboloidal in configuration.

19. The device according to claim 12 wherein said glass is shaped to converge emitted light at a focal point outside said glass, and said focal point is said photomultiplier tube.

20. The device according to claim 19 wherein said glass is hemi-ellipsoidal in shape with the flat base abutting said photomultiplier tube and the second focal point of the ellipsoid which forms said hemi-ellipsoid is the photomultiplier tube which said glass abuts.

21. An X-ray scintillator screen comprising a flat plate screen having opposed major surfaces, one of said major surfaces forms a radiated surface for incident X-rays and the opposite major surface forms the exit surface, said flat plate screen comprised of an X-ray photoluminescent glass having the formula $$n(MO \cdot P_2O_5)[(1-y)Tb_2O_3 \cdot yCe_2O_3 \cdot 3P_2O_5],$$

wherein M is a divalent cation, y is greater than or equal to zero but less than 1 and n is greater than zero but less than or equal to 16.

22. The X-ray scintillator screen according to claim 21 further comprising a reflective coating of $Al_2O_3$ on the major surface incident to X-ray radiation.

23. An X-ray scintillator screen comprising a sheet of glass fibers wherein the axis of said fibers are aligned parallel to an incident X-ray beam, said fibers comprised of an X-ray photoluminescent glass having the formula $$n(MO \cdot P_2O_5)[(1-y)Tb_2O_3 \cdot yCe_2O_3 \cdot 3P_2O_5],$$

wherein M is a divalent cation, $0 \leq y < 1$, and $0 < \eta \leq 16$.

* * * * *